(12) United States Patent
Xing et al.

(10) Patent No.: US 11,985,634 B2
(45) Date of Patent: May 14, 2024

(54) SIDELINK RESOURCE CONFIGURATION METHOD AND APPARATUS, SIDELINK COMMUNICATION METHOD AND APPARATUS, BASE STATION, TERMINAL, AND STORAGE MEDIUM

(71) Applicant: ZTE CORPORATION, Shenzhen (CN)

(72) Inventors: Weimin Xing, Shenzhen (CN); Youxiong Lu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 585 days.

(21) Appl. No.: 17/273,701

(22) PCT Filed: Sep. 5, 2019

(86) PCT No.: PCT/CN2019/104582
§ 371 (c)(1),
(2) Date: Mar. 4, 2021

(87) PCT Pub. No.: WO2020/048514
PCT Pub. Date: Mar. 12, 2020

(65) Prior Publication Data
US 2021/0329633 A1 Oct. 21, 2021

(30) Foreign Application Priority Data
Sep. 5, 2018 (CN) .......................... 201811033599.3

(51) Int. Cl.
*H04W 4/00* (2018.01)
*H04L 5/00* (2006.01)
(Continued)

(52) U.S. Cl.
CPC ....... *H04W 72/0446* (2013.01); *H04L 5/0048* (2013.01); *H04L 5/14* (2013.01); *H04W 72/0453* (2013.01)

(58) Field of Classification Search
CPC .......... H04W 72/0446; H04W 72/0453; H04W 72/20; H04W 76/14; H04W 72/51; H04W 92/18; H04L 5/0048; H04L 5/14
See application file for complete search history.

(56) References Cited

U.S. PATENT DOCUMENTS 10,142,045 B2 * 11/2018 Deng ................ H04L 25/03159
10,484,926 B2 * 11/2019 Panteleev ......... H04W 72/1268
(Continued)

FOREIGN PATENT DOCUMENTS

CN 105704812 A 6/2016
CN 106376050 2/2017
(Continued)

OTHER PUBLICATIONS

Ericsson "Considerations and Design Principles for NR Sidelink" 3GPP TSG-RAN WG1 Meeting #94, Aug. 20-24, 2018, R1-1809306.
(Continued)

*Primary Examiner* — Stephen M D Agosta
(74) *Attorney, Agent, or Firm* — Knobbe, Martens, Olson & Bear, LLP

(57) ABSTRACT

A sidelink resource configuration method includes: configuring or pre-configuring a sidelink resource pool for a user equipment (UE) to perform sidelink communications using a resource in the sidelink resource pool; where the sidelink resource pool uses a second time slot as granularity and includes resource blocks; and where a length of the second time slot is determined according to a second time-frequency parameter for defining the sidelink resource pool, the second time slot is determined by mapping from a first time slot included in a set of alternative resources according to a conversion relationship between the second time-frequency parameter and a first time-frequency parameter used by the set of alternative resources, and a length of the first time slot
(Continued)

is determined according to the first time-frequency parameter.

19 Claims, 3 Drawing Sheets

(51) Int. Cl.
    *H04L 5/14*     (2006.01)
    *H04W 72/0446*     (2023.01)
    *H04W 72/0453*     (2023.01)

(56) References Cited

U.S. PATENT DOCUMENTS

| | | | | |
|---|---|---|---|---|
| 10,588,124 | B2* | 3/2020 | Chen | H04W 72/0446 |
| 10,728,879 | B2* | 7/2020 | Kim | H04L 5/0012 |
| 11,005,607 | B2* | 5/2021 | Basu Mallick | H04L 1/08 |
| 2011/0280325 | A1* | 11/2011 | Fernandez | H04L 25/0232 |
| | | | | 375/260 |
| 2017/0019886 | A1* | 1/2017 | Patel | H04W 72/23 |
| 2017/0086028 | A1* | 3/2017 | Hwang | H04W 72/02 |
| 2017/0188320 | A1* | 6/2017 | Xiong | H04W 8/005 |
| 2017/0324455 | A1* | 11/2017 | Soriaga | H04L 25/0202 |
| 2017/0332370 | A1* | 11/2017 | Rico Alvarino | H04L 5/0048 |
| 2018/0035437 | A1* | 2/2018 | Kahtava | H04B 7/15528 |
| 2018/0077746 | A1* | 3/2018 | Lee | H04L 5/006 |
| 2018/0192459 | A1* | 7/2018 | Xu | H04W 28/18 |
| 2018/0227155 | A1* | 8/2018 | Khoryaev | H04L 27/26025 |
| 2018/0279233 | A1* | 9/2018 | Wang | H04W 52/06 |
| 2018/0376474 | A1* | 12/2018 | Khoryaev | H04L 1/0007 |
| 2018/0376485 | A1* | 12/2018 | Kahtava | H04W 4/44 |
| 2019/0014564 | A1* | 1/2019 | Lee | H04W 72/121 |
| 2019/0036738 | A1* | 1/2019 | Miao | H04L 25/02 |
| 2019/0059071 | A1* | 2/2019 | Khoryaev | H04W 4/021 |
| 2019/0103931 | A1* | 4/2019 | Yi | H04B 7/2656 |
| 2019/0116592 | A1* | 4/2019 | Moon | H04L 5/0092 |
| 2019/0166620 | A1* | 5/2019 | Yasukawa | H04W 74/08 |
| 2019/0173612 | A1* | 6/2019 | Kimura | H04L 1/0063 |
| 2019/0182840 | A1* | 6/2019 | Feng | H04W 74/0816 |
| 2019/0229964 | A1* | 7/2019 | Ouchi | H04L 5/0051 |
| 2019/0357154 | A1* | 11/2019 | Zeng | H04W 52/383 |
| 2020/0059954 | A1* | 2/2020 | Wu | H04W 4/40 |
| 2020/0169375 | A1* | 5/2020 | Yi | H04L 27/26025 |
| 2020/0228283 | A1* | 7/2020 | Cai | H04L 5/26 |
| 2020/0235887 | A1* | 7/2020 | Hou | H04W 72/1263 |
| 2020/0296692 | A1* | 9/2020 | Lee | H04W 52/383 |
| 2020/0366425 | A1* | 11/2020 | Takeda | H04L 1/1854 |
| 2020/0374909 | A1* | 11/2020 | Takeda | H04W 72/535 |
| 2021/0050950 | A1* | 2/2021 | Zhou | H04W 76/14 |
| 2021/0051638 | A1* | 2/2021 | Lu | H04L 5/0094 |
| 2021/0092717 | A1* | 3/2021 | Takeda | H04W 72/04 |
| 2021/0092756 | A1* | 3/2021 | Takeda | H04W 72/21 |
| 2021/0160901 | A1* | 5/2021 | Takeda | H04L 5/0053 |
| 2021/0176747 | A1* | 6/2021 | Yang | H04W 72/0446 |
| 2021/0212050 | A1* | 7/2021 | Lu | H04L 5/0005 |

FOREIGN PATENT DOCUMENTS

| | | |
|---|---|---|
| CN | 107852777 A | 3/2018 |
| CN | 107889073 A | 4/2018 |
| EP | 3051736 A1 | 8/2016 |
| EP | 3206452 A1 | 8/2017 |
| WO | WO 2017/188803 A2 | 11/2017 |
| WO | WO 2017/188803 A3 | 11/2017 |
| WO | WO 2017/196639 A2 | 11/2017 |
| WO | WO 2017/196639 A3 | 11/2017 |
| WO | WO 2018/012882 A1 | 1/2018 |

OTHER PUBLICATIONS

Qualcomm Incorporated "Design principles for physical layer aspects of NR V2X" 3GPP TSG RAN WG1 #94, Aug. 20-24, 2018, R1-1809447.
International Search Report for PCT/CN2019/104582 dated Dec. 4, 2019.
On remaining details of BWPs, 3GPP TSG-RAN WG1 Meeting #93, Busan, South Korea, May 21-25, 2018, Source: Nokia, Nokia Shanghai Bell (Discussion and Document) (7 pages).
May 24, 2022 Extended European Search Report from related EP App. No. 19857758.7 (13 pgs).
Aug. 29, 2022 First Office Action from CN201811033599.3 (14 pgs).
Aug. 23, 2022 CN Search Report from CN2018110335993 (4 pgs).
Discussion on slot structure indication, 3GPP TSG RAN WG1 Meeting #88bis, LG Electronics, Spokane, WA US Apr. 3-7, 2017.
Considerations on sidelink physical layer structures, 3GPP TSG RAN WG1 Meeting #94, Fujitsu, Gothenburg, Sweden, Aug. 20-24, 2018.
Ericsson, R1-1809304, Radio Resource Management for NR Sidelink Communication, 3GPP TSG RAN WG1 #94, 3GPP server publication date (Aug. 10, 2018).
Oppo, R1-1808878, Enhancement of LTE Uu and NR Uu to control NR sidelink, 3GPP TSG RAN WG1 #94, 3GPP server publication date (Aug. 10, 2018).
Korean Office Action for Korean Application No. 10-2021-7009671 dated Feb. 10, 2023.

* cited by examiner

SIDELINK RESOURCE CONFIGURATION METHOD AND APPARATUS, SIDELINK COMMUNICATION METHOD AND APPARATUS, BASE STATION, TERMINAL, AND STORAGE MEDIUM

CROSS-REFERENCES TO RELATED APPLICATIONS

This application is a national stage application filed under 35 U.S.C. 371 based on International Patent Application No. PCT/CN2019/104582, filed on Sep. 5, 2019, which claims priority to Chinese Patent Application No. 201811033599.3 filed with the CNIPA on Sep. 5, 2018, the disclosures of which are incorporated herein by reference in their entireties.

TECHNICAL FIELD

The embodiments of the present disclosure relate to, but are not limited to, the field of communications and, in particular, relates to, but is not limited to, a sidelink resource configuration method and apparatus, a sidelink communication method and apparatus, a base station, a terminal, and a storage medium in the field of sidelink communications.

BACKGROUND

In a sidelink communication system, when traffic needs to be transmitted between user equipments (UEs), traffic data between the UEs may be directly transmitted by a data source UE to a target UE through a sidelink without being forwarded by a network side. For example, referring to FIG. 1 which is a schematic diagram of the sidelink communication system in the related art, a UE obtains a resource from a resource pool to send a signal in sidelink communications.

In the sidelink communication system, according to specific application scenarios and traffic types, etc., the sidelink communications includes device to device (D2D) communication and vehicle-to-everything communication including vehicle to vehicle (V2V) communication or vehicle to anything (V2X) communication, etc. As the demand for the vehicle-to-everything communication and direct communication increases, increasing requirements, such as increasing a rate, improving reliability, and reducing a delay are imposed on the sidelink communication system on the market, in order to support advanced services such as automatic driving, remote driving, fleet driving, and sensor data sharing. To satisfy these requirements, the 5th generation mobile communication technology (5G), which may also be referred to as New Radio (NR), is inevitably introduced into the sidelink. The NR may flexibly adopt various numerologies which are referred to as time-frequency parameters here. One numerology may be construed as one of time-frequency parameters which may include a subcarrier spacing (SCS) and a length of a cyclic prefix (CP), where different time-frequency parameters include different SCSs. A Long Term Evolution (LTE) system includes only one time-frequency parameter with a fixed sub-carrier spacing of 15 kHz. Therefore, in the related sidelink communication system, only this time-frequency parameter is considered when resource configuration and application are performed. Therefore, it is not applicable to a communication technology with more than two time-frequency parameters, such as the 5G communication system.

SUMMARY

Embodiments of the present disclosure provide a sidelink resource configuration method and apparatus, a sidelink communication method and apparatus, a base station, a terminal, and a storage medium which mainly solve the problem of how to introduce a communication technology with multiple time-frequency parameters (numerologies) into sidelink communications.

To solve the above problem, the embodiments of the present disclosure further provide a sidelink resource configuration method. The method includes a step described below.

A sidelink resource pool is configured or pre-configured for a user equipment (UE) to perform sidelink communications using a resource in the sidelink resource pool.

An ith resource block is k(i) times a second time slot, where k(i) is a rational number greater than 0 and i is greater than or equal to 1.

A length of the second time slot is determined according to a second time-frequency parameter for defining the sidelink resource pool, the second time slot is determined by mapping from a first time slot included in a set of alternative resources according to a conversion relationship between the second time-frequency parameter and a first time-frequency parameter used by the set of alternative resources, and a length of the first time slot is determined according to the first time-frequency parameter.

To solve the above problem, the embodiments of the present disclosure further provide a sidelink communication method. The method includes a step described below.

A signal is sent on a resource block in the sidelink resource pool acquired by the sidelink resource configuration method described above, where the signal is sent using a third time-frequency parameter for sending signals with the sidelink resource pool.

To solve the above problem, the embodiments of the present disclosure further provide a sidelink resource configuration apparatus. The apparatus includes a configuration module.

The configuration module is configured to configure or pre-configure a sidelink resource pool for a user equipment (UE) to perform sidelink communications using a resource in the sidelink resource pool.

An ith resource block is k(i) times a second time slot, where k(i) is a rational number greater than 0 and i is greater than or equal to 1.

A length of the second time slot is determined according to a second time-frequency parameter for defining the sidelink resource pool, the second time slot is determined by mapping from a first time slot included in a set of alternative resources according to a conversion relationship between the second time-frequency parameter and a first time-frequency parameter used by the set of alternative resources, and a length of the first time slot is determined according to the first time-frequency parameter.

To solve the above problem, the embodiments of the present disclosure further provide a sidelink communication apparatus. The apparatus includes a signal sending module.

The signal sending module is configured to send a signal on a resource block in a sidelink resource pool acquired by the sidelink resource configuration method described above, where the signal is sent using a third time-frequency parameter for sending signals with the sidelink resource pool.

To solve the above problem, the embodiments of the present disclosure further provide a base station. The base station includes a first processor, a first memory, and a first communication bus.

The first communication bus is configured to implement a communication connection between the first processor and the first memory.

The first processor is configured to execute one or more first computer programs stored in the first memory to implement steps of the sidelink resource configuration method described above.

To solve the above problem, the embodiments of the present disclosure provide a terminal. The terminal includes a second processor, a second memory, and a second communication bus.

The second communication bus is configured to implement a communication connection between the second processor and the second memory.

The second processor is configured to execute one or more second computer programs stored in the second memory to implement steps of the sidelink communication method described above.

To solve the above problem, the embodiments of the present disclosure further provide a computer-readable storage medium. The computer-readable storage medium stores one or more first computer programs executable by one or more processors to implement steps of the sidelink resource configuration method described above.

Alternatively, the computer-readable storage medium stores one or more second computer programs executable by one or more processors to implement steps of the sidelink communication method described above.

According to the sidelink resource configuration method and apparatus, the sidelink communication method and apparatus, the base station, the terminal, and the storage medium provided by the embodiments of the present disclosure, when the sidelink resource pool is configured for the UE, the sidelink resource pool is configured or pre-configured to use the second time slot as granularity, and the resource block in the sidelink resource pool is k(i) times the second time slot, where the length of the second time slot is determined according to the second time-frequency parameter for defining the sidelink resource pool, the second time slot is determined by mapping from the first time slot included in the set of alternative resources according to the conversion relationship between the second time-frequency parameter and the first time-frequency parameter used by the set of alternative resources, and the length of the first time slot is determined according to the first time-frequency parameter. That is, for the set of alternative resources, the first time slot in the set of alternative resources is determined according to the first time-frequency parameter serving as a reference time-frequency parameter (or referred to as a basic time-frequency parameter), and when the sidelink resource pool is determined, the second time slot in the resource pool is obtained by mapping from the corresponding first time slot according to the conversion relationship between the first time-frequency parameter and the second time-frequency parameter for defining the sidelink resource pool. Therefore, the present disclosure is applicable to a communication technology with more than two time-frequency parameters which, for example, includes, but is not limited to, a 5G technology. Of course, the present disclosure is also applicable to a communication technology with only one time-frequency parameter.

DETAILED DESCRIPTION

Embodiments of the present disclosure are further described below in detail in conjunction with the drawings and specific implementations. It is to be understood that the embodiments described herein are merely intended to explain the present application and not to limit the present application.

Embodiment One

To introduce a communication technology with multiple time-frequency parameter, numerologies, which, for example, includes, but is not limited to, a 5G technology, into sidelink communications, this embodiment provides a sidelink resource configuration method and a sidelink communication method. According to the methods, in a set of alternative resources, a first time slot in the set of alternative resources is determined according to a first time-frequency parameter serving as a reference time-frequency parameter (or referred to as a basic time-frequency parameter), and when a sidelink resource pool is determined, a second time slot in the resource pool is obtained by mapping from the corresponding first time slot in the set of alternative resources according to a conversion relationship between the first time-frequency parameter and a second time-frequency parameter for defining the sidelink resource pool. Therefore, the methods are applicable to the communication technology with more than two time-frequency parameters which, for example, includes, but is not limited to, the 5G technology. Of course, the methods are also applicable to a communication technology with only one time-frequency parameter.

In this embodiment, when the sidelink resource pool is configured for a UE, configuration signaling may be sent to the UE by a network-side device (including, but not limited to, a base station) to implement the configuration of the sidelink resource pool. This manner is referred to as configuring in this embodiment. The configuration of the sidelink resource pool may also implemented in such a manner that pre-configuration signaling is stored on the UE. This manner is referred to as pre-configuring in this embodiment. It is to be understood that the manner specifically used may be flexibly selected according to requirements. Moreover, the resource configuration process exemplified below in this embodiment is applicable to at least one of the preceding two manners.

Figure 1:
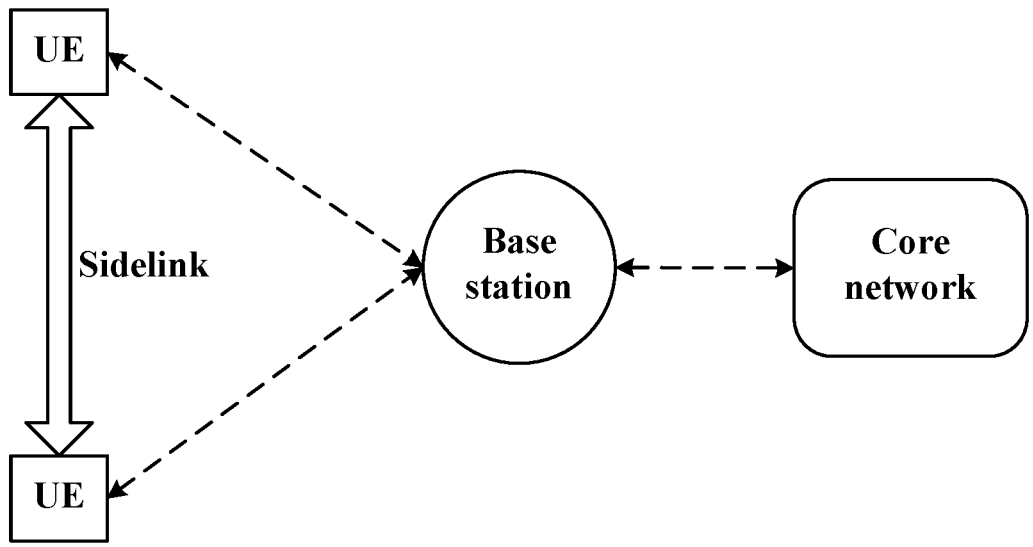
FIG. 1 is a structural diagram of a sidelink communication system in the related art.
Figure 2:
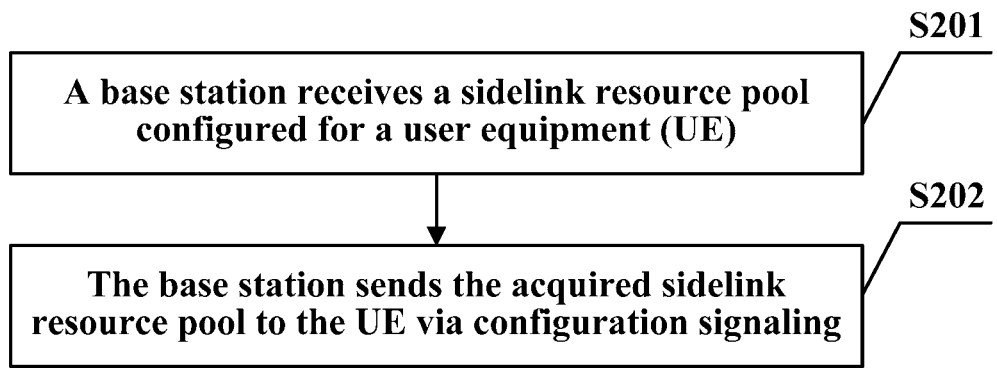
FIG. 2 is a flowchart illustrating that a resource is configured for a UE through a base station according to embodiment one of the present application.

For example, in an example, when the configuration is performed for the UE by the network-side device (using the base station as an example), as shown in FIG. 2, the process includes steps described below.

In S201, the base station receives the sidelink resource pool configured for the user equipment (UE).

In S202, the base station sends the acquired sidelink resource pool to the UE via the configuration signaling.

In an example of this embodiment, the sidelink resource configuration method includes configuring or pre-configuring the sidelink resource pool for the user equipment (UE) to perform the sidelink communications using a resource in the sidelink resource pool. In this embodiment, the sidelink resource pool may be configured for all UEs that can receive a broadcast or may be separately configured or pre-configured for a certain UE or some UEs.

In this embodiment, the sidelink resource pool uses the second time slot as granularity and includes resource blocks (transmission time intervals, TTIs). In this embodiment, one resource block is a resource length required to be occupied by one sidelink transmission, and an ith resource block in the sidelink resource pool is k(i) times the second time slot, where k(i) is greater than 0. In an example, k(i) may be a rational number greater than 0, and the value of i is greater than or equal to 1 and less than or equal to the total number J of resource blocks included in the resource pool. For example, in some application examples, the value of k(i) may be an integer value or a non-integer value greater than or equal to 1, such as 1 or 2. That is, in some application examples, the resource block includes at least one complete second time slot. In other application examples, the value of the resource block may also be a decimal value greater than 0 and less than 1, such as 0.5. That is, the resource block is equal to half the second time slot. Moreover, the lengths of multiple resource blocks in one sidelink resource pool may be the same or partially the same or totally different, which may be flexibly set according to specific application scenarios or the like.

In this embodiment, a length of the second time slot in the sidelink resource pool is determined according to the second time-frequency parameter for defining the sidelink resource pool, the second time slot is determined by mapping from the first time slot included in the set of alternative resources according to the conversion relationship between the second time-frequency parameter and the first time-frequency parameter used by the set of alternative resources, and a length of the first time slot is determined according to the first time-frequency parameter.

The time-frequency parameter in this embodiment may be a parameter for determining at least one of a subcarrier spacing, a symbol time length, or a CP length. For example, the time-frequency parameter may include a subcarrier spacing parameter and also include a CP length parameter or the like.

In this embodiment, when a certain communication system or technology (such as the 5G technology) includes multiple time-frequency parameters, different time-frequency parameters may include different subcarrier spacings. The 5G technology is used as an example below. However, it is to be understood that the communication system or technology is not limited to the 5G technology.

In an example, the sidelink communications may adopt the same synchronization frame structure as a cellular network, which avoids interference and simplifies scheduling in the case of coexistence with the cellular network. In an application example, one radio frame in LTE is 10 ms and includes 10 subframes of 1 ms, one subframe includes two time slots (i.e., slots), and each slot includes 7 symbols. Considering that New Radio (NR) may flexibly adopt multiple time-frequency parameters (numerologies) when the sidelink transmission is introduced into the NR, for example, in an example, the subcarrier spacing may be $\Delta f = 2^\mu \cdot 15$ [kHz] for the NR, where $\mu = 0, 1, 2, \ldots 5$, that is, in this example, the NR may include six time-frequency parameters. In the six time-frequency parameters, different subcarrier spacings correspond to different symbol lengths and correspond to different frame structures. For example, in this example, one subframe of 1 ms in the NR is still used as an example and subframe structures in the NR may be summarized as follows in Table 1. In Table 1, $N_{symb}^{slot}$ denotes the number of symbols included in each time slot, $N_{slot}^{frame,\mu}$ denotes the number of slots included in each frame, and $N_{slot}^{subframe,\mu}$ denotes the number of slots included in each subframe. In an example, the NR may support multiple numerologies to be simultaneously used on one carrier.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In this example, the first time-frequency parameter (that is, the reference time-frequency parameter) may be any one of the above six time-frequency parameters, and a correspondence between subframe structures and the six time-frequency parameters is shown in Table 1. The second time-frequency parameter may be any one of the above six time-frequency parameters according to specific application scenarios and the second time-frequency parameter may be the same as or different from the first time-frequency parameter so long as the conversion relationship (correspondence) between the first time-frequency parameter and the second time-frequency parameter is clear.

For example, in an example, the first time-frequency parameter may be a time-frequency parameter with a minimum subcarrier spacing, that is, a time-frequency parameter corresponding to a time slot or a symbol with the longest duration, among various time-frequency parameters included in a current communication system.

In this embodiment, the method further includes: configuring or pre-configuring bandwidth parts (BWPs) on a carrier, where each of the BWPs corresponds to one fourth time-frequency parameter. Moreover, in an example, different fourth time-frequency parameters include different subcarrier spacings. It is to be understood that the carrier in this embodiment may include one or more BWPs. When the carrier includes multiple BWPs, the BWPs may correspond to the same fourth time-frequency parameter or different fourth time-frequency parameters, that is, different BWPs may correspond to the same subcarrier spacing or different subcarrier spacings, which may be flexibly set according to communication requirements.

In this embodiment, the sidelink resource pool further includes a third time-frequency parameter used currently. The third time-frequency parameter may be a pre-configured time-frequency parameter and may be the same as or different from one of the first time-frequency parameter, the second time-frequency parameter, or the fourth time-frequency parameter. For example, in an example, a manner for setting the third time-frequency parameter includes, but is not limited to, any one of the following two manners: the third time-frequency parameter is the configured or pre-configured time-frequency parameter, that is, a current time-frequency parameter (numerology) indicated in the configuration or pre-configuration signaling; or the third time-frequency parameter is a fourth time-frequency parameter which is configured or pre-configured to indicate one of the BWPs to which the sidelink resource pool belongs.

Correspondingly, the sidelink resource pool in this embodiment further includes a frequency domain range which may, but may not necessarily, be indicated in at least one of the following manners: indicating a frequency domain range of a sidelink resource based on a subcarrier spacing included in the second time-frequency parameter; indicating a frequency domain range of a sidelink resource based on a subcarrier spacing included in the third time-frequency parameter; or indicating a frequency domain range of a sidelink resource based on a subcarrier spacing in the fourth time-frequency parameter of the BWP to which the sidelink resource pool belongs.

In this embodiment, the set of alternative resources further includes first resource transmission indication information for indicating whether a first symbol included in a first time slot or a first time slot in the set of alternative resources within a configuration period is available for the sidelink transmission. In an example, the configuration period is equal to a resource configuration period or a System Frame Number (SFN) period or a Direct Frame Number (DFN) period of cellular network data on the carrier.

The sidelink resource pool further includes default symbol configuration information for indicating whether a second symbol included in a resource block is available for the sidelink transmission. In this embodiment, the default symbol configuration information may also be referred to as a default configuration or predefined indication information.

In an example of this embodiment, the first resource transmission indication information may include, but is not limited to, at least one of indication information described below.

Indication information one is information indicating that a first time slot or a first symbol on a current carrier and configured to be a downlink resource is unavailable for the sidelink transmission.

Indication information two is information indicating that a first time slot or a first symbol on a current carrier and configured to be flexible (a flexible resource) is unavailable for the sidelink transmission.

Indication information three is information indicating that a first time slot or a first symbol on a current carrier and configured to send a synchronization signal is unavailable for the sidelink transmission.

Indication information four is information indicating that a first time slot or a first symbol on a current carrier and configured to be reserved is unavailable for the sidelink transmission.

Indication information five is information indicating that within the configuration period a first time slot n which satisfies that b (n mod L1)=1 is available for the sidelink transmission, where mod denotes a modulo calculation, n=0, 1, . . . , N−1, N is the number of first time slots within the configuration period, and L1 is a length of a first bitmap (b0, b1, . . . , bL1−1).

In an example, the first resource transmission indication information about which first time slot or first symbol included in the first time slot is unavailable (or available) for the sidelink transmission may be determined by at least one of indication information one to four in conjunction with indication information five. A specific indication manner may be flexibly set according to specific application scenarios.

In another example of this embodiment, assuming that when a configuration conflicts with cellular network traffic, an indication may be performed by resource transmission indication information. For example, the first resource transmission indication information includes at least one of indication information described below. In a case where a certain first time slot is configured or pre-configured to be available for the sidelink transmission and the first time slot is configured or pre-configured to be a downlink time slot or includes a downlink symbol, the first time slot or the corresponding downlink symbol in the first time slot is unavailable for the sidelink transmission. In a case where a certain first time slot is configured or pre-configured to be available for the sidelink transmission and the first time slot is configured or pre-configured to send a sidelink synchronization signal, the first time slot is unavailable for the sidelink transmission. In a case where a certain first time slot is configured or pre-configured to be available for the sidelink transmission and the first time slot is configured or pre-configured to be a reserved time slot or includes a reserved symbol, the first time slot or the reserved symbol included in the first time slot is unavailable for the sidelink transmission. In a case where a certain first time slot is configured or pre-configured to be available for the sidelink transmission and the first time slot is configured or pre-configured to be a flexible time slot or includes a flexible symbol, the first time slot or the flexible symbol in the first time slot is unavailable for the sidelink transmission. Of course, in an example, the first time slot or the flexible symbol in the first time slot is available for the sidelink transmission.

In another example of this embodiment, explicit symbol configuration information for indicating whether the second symbol in the resource block is available for the sidelink transmission may also be configured in the sidelink resource pool. Moreover, it is to be understood that one resource block may correspond to one piece of explicit symbol configuration information, one piece of explicit symbol configuration information may also correspond to a group of resource blocks with the same structure, or one piece of explicit symbol configuration information indicates multiple resource blocks which may have different structures. Therefore, the explicit symbol configuration information may be specifically set in a flexible manner. Moreover, it may also be flexibly determined according to specific application scenarios that the explicit symbol configuration information specifically indicates which second symbols are unavailable (or available) for the sidelink transmission.

In an example of this embodiment, when a certain resource block in the sidelink resource pool is configured with both the default symbol configuration information and the explicit symbol configuration information, the default symbol configuration information is overwritten with the explicit symbol configuration information. That is, the explicit symbol configuration information is used as reference, that is, a priority of the explicit symbol configuration information is configured to be higher than that of the default symbol configuration information.

Figure 3:
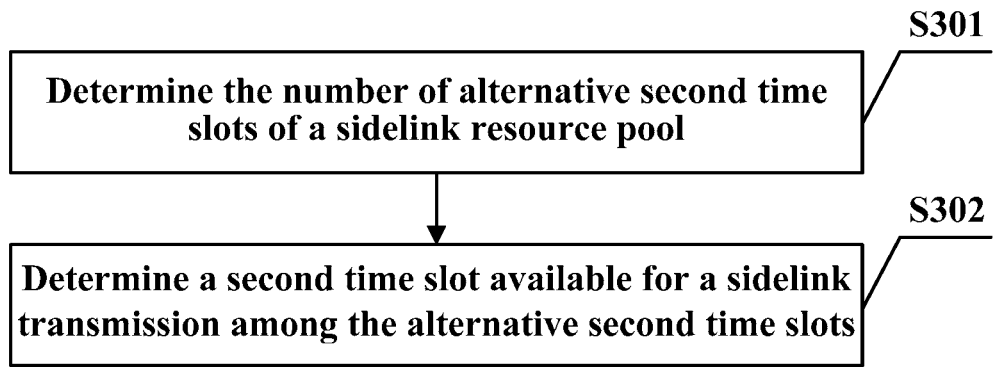
FIG. 3 is a flowchart illustrating a mapping process of a second time slot according to embodiment one of the present application.

In this embodiment, the step of determining the second time slot belonging to the sidelink resource pool by mapping from the first time slot included in the set of alternative resources according to the conversion relationship between the second time-frequency parameter and the first time-frequency parameter used by the set of alternative resources, as shown in FIG. 3, includes steps described below.

In S301, the number of alternative second time slots of the sidelink resource pool is determined to be $N*2^\mu$, where N is the number of first time slots in the set of alternative resources within the configuration period, and $2^\mu$ is a ratio of the subcarrier spacing in the second time-frequency parameter to the subcarrier spacing in the first time-frequency parameter.

In S302, it is determined that a second time slot m which satisfies that b (m mod L2)=1 among $N*2^\mu$ second time slots belongs to the sidelink resource pool, where m=0, 1, . . . , $N*2^\mu-1$, and L2 is a length of a second bitmap (b0, b1, . . . , bL2−1).

In an example of this embodiment, the resource block in the sidelink resource pool may further include pre-symbol indication information for indicating Xa second symbols which belong to pre-symbols and are in the resource block. The Xa second symbols are mainly used for automatic gain control (AGC) adjustment, and Xa is a rational number greater than or equal to 0.

In an example of this embodiment, the default symbol configuration information and/or the explicit symbol configuration information include an indication that Xb second symbols serve as a guard period (GAP).

The Xa second symbols and the Xb second symbols are consecutive second symbols, where Xb is a rational number greater than or equal to 0. In an application example, Xa+Xb may be greater than or equal to 1. That is, in this embodiment, the pre-symbols and the second symbols serving as the GAP may be combined together to occupy Xa+Xb second symbols for uniform setting and management. For example, first or last second symbols may be uniformly set and used. Correspondingly, in this embodiment, the sidelink resource pool further includes timing advance configuration information of the sidelink communications.

For example, in an example, the timing advance configuration information of the sidelink communications includes at least one of configurations described below. In a case where a dedicated carrier (which, for example, includes, but is not limited to, an unlicensed carrier, a dedicated carrier of the sidelink communications, or the like) is used, a timing advance of the sidelink communications is 0.

In a case where a frequency-division duplexing (FDD) carrier is used, a timing advance of the sidelink communications is greater than or equal to a preset maximum time advance (TA). The maximum time advance (TA) in this embodiment may be twice a maximum propagation delay of the UE under a maximum coverage radius of the base station.

In a case where a time-division duplexing (TDD) carrier is used, a timing advance of the sidelink communications is greater than or equal to a sum of a preset maximum time advance (TA) and receive/transmit transition time, or greater than or equal to a sum of 2*TA and the receive/transmit transition time, or greater than or equal to a sum of 2*TA and twice the receive/transmit transition time.

This embodiment further provides a sidelink communication method. The method includes: sending a signal on a resource block in a sidelink resource pool acquired by the sidelink resource configuration method described above, where the signal is sent using a third time-frequency parameter for sending signals with the sidelink resource pool.

In an example of this embodiment, at least one of the following is sent on a second symbol which belongs to a pre-symbol and in the resource block: a data channel symbol, a demodulation reference signal (DMRS) symbol for data demodulation, a preamble signal symbol, or a sidelink control channel symbol. In an example, these symbols may also be sent using a frequency comb.

In an example, DMRS symbols for data demodulation may also be sent using the frequency domain comb. In an example, symbols of the control channel may also be sent using the frequency domain comb or repeatedly sent in time/frequency domain.

Embodiment Two

For ease of understanding, a further description is provided in this embodiment by using a configuration process of configuring a set of alternative resources (including alternative time domain resources and alternative frequency domain resources) as an example.

In this embodiment, a set of alternative time domain resources available for a sidelink transmission may be (pre-)configured/determined, where one alternative resource is defined by the resource granularity of a first time slot determined by a first time-frequency parameter (that is, a reference time-frequency parameter (reference numerology)). Several configuration examples are examples one to three illustrated below. In addition, the alternative frequency domain resources available for the sidelink transmission may also be (pre-)configured/determined. For example, one or more sidelink BWPs may be configured, where each BWP corresponds to one time-frequency parameter (that is, a fourth time-frequency parameter). As described in example four, in an example, the subcarrier spacings included in the fourth time-frequency parameters corresponding to all sidelink BWPs on one carrier are greater than or equal to the subcarrier spacing included in the first time-frequency parameter.

Example One

How to determine the set of alternative time domain resources for the sidelink transmission is described in this example. The sidelink transmission may be performed on the same carrier as a transmission of cellular network traffic, that is, they share the same carrier. In this example, two different transmissions may need to share the same carrier. In this case, interference may be caused if both the two different transmissions occupy the same resource. In order to avoid the interference, resources available for a sidelink may be limited in an example. For example, the simultaneous use of a sidelink resource and a downlink resource may cause great interference to the cellular network traffic. Therefore, in an example, sidelink sending cannot be performed on a resource scheduled to be the downlink resource. In this example, a method for determining the alternative time domain resources available for the sidelink on a carrier or channel may include methods described below.

A configuration period of sidelink resources is configured and the configuration period includes several time domain resource granularities. In this example, the resource granularity is the first time slot (that is, a reference slot) defined by the reference numerology, and the reference slot includes several first symbols (that is, reference symbols) defined by the reference numerology. A length of the sidelink configuration period may be equal to the length of a resource configuration period of cellular network data on the carrier, that is, a resource configuration period of a cell corresponding to the carrier (in this example, when more than two cell resource periods are configured on the carrier, the configuration period of sidelink resources is a sum of the more than two cell resource periods), or may be equal to an SFN period or a DFN period, that is, 10240 subframes (10240 ms) in an example. First resource transmission indication information is included in one configuration period and may indicate that all resources other than at least one of the following may be used for the sidelink transmission: a reference slot or a reference symbol on the current carrier and configured to be the downlink (DL) resource, a reference slot or a reference symbol on the current carrier and configured to be flexible (a flexible resource), a reference slot or a reference symbol on the current carrier and configured to send a sidelink synchronization signal, or a reference slot or symbol on the current carrier and determined to be reserved (e.g., a GAP).

Example Two

In example one, the resources available for the sidelink transmission can be determined based on the knowledge of a configuration of a cellular network on a carrier. In this example, another method for determining the time domain resources available for the sidelink on the carrier includes methods described below.

The configuration period of sidelink resources is configured and the configuration period includes several (for example, N) time domain resource granularities, where the resource granularity is the first time slot (that is, the reference slot) defined by the first time-frequency parameter (that is, the reference numerology), and the reference slot includes several first symbols (that is, the reference symbols) defined by the reference time-frequency parameter. The length of the sidelink configuration period may be equal to the resource configuration period of cellular network data on the carrier, that is, the resource configuration period of the cell corresponding to the carrier, or may be equal to the SFN period or the DFN period, that is, 10240 subframes (one subframe is 1 ms). The first resource transmission indication information directly indicates a time domain resource available for the sidelink transmission on a carrier. For example, A bitmap (b0, b1, ..., bL1−1) with a length of L1 is set. If a reference slot n within the configuration period satisfies that b (n mod L1)=1, the reference slot n is available for the sidelink transmission, where n=0, 1, ..., N−1.

In an example, L1 may be equal to N. In this case, each bit in the bitmap corresponds to one reference slot within the configuration period.

In addition, it is assumed in the above examples that a network side does not configure a resource conflicting with the cellular network traffic for the sidelink to use. Optionally, this example further includes at least one of steps described below. If the network side configures or pre-configures a certain reference slot n to be available for the sidelink transmission in the above method of this example and the reference slot n is configured or pre-configured by the network side to be a downlink time slot or includes a downlink symbol, the slot or the downlink symbol in the slot cannot be used for the sidelink transmission. If the network side configures or pre-configures a certain reference slot n to be available for the sidelink transmission in the above method of this example and the reference slot n is configured or pre-configured by the network side to send a sidelink synchronization signal, the slot cannot be used for the sidelink transmission. If the network side configures or pre-configures a certain reference slot n to be available for the sidelink transmission in the above method of this example and the reference slot n is configured or pre-configured by the network side to be a reserved or flexible time slot or includes a reserved or flexible symbol, the slot or the flexible symbol in the slot cannot be used for the sidelink transmission, or the slot or the flexible symbol in the slot can still be used for the sidelink transmission.

Example Three

An exemplary description is provided in example three in conjunction with examples one and two. In this example, the configuration period of sidelink resources is configured and the configuration period includes several time domain resource granularities. In this example, the resource granularity is the first time slot (that is, the reference slot) defined by the reference numerology, and the reference slot includes several first symbols (that is, the reference symbols) defined by the reference numerology. The length of the sidelink configuration period may be equal to the resource configuration period of cellular network data on the carrier, that is, the resource configuration period of the cell corresponding to the carrier (in this example, when more than two resource periods are configured on the carrier, the configuration period of sidelink resources is the sum of the more than two resource periods), or may be equal to the SFN period or the DFN period, that is, 10240 subframes (10240 ms) in an example. Within a configuration period, the following resources, at least one of which is unavailable for the sidelink transmission, are excluded: the reference slot or the reference symbol on the current carrier and configured to be the downlink (DL) resource, the reference slot or the reference symbol on the current carrier and configured to be flexible (the flexible resource), the reference slot or the reference symbol on the current carrier and configured to send the sidelink synchronization signal, or the reference slot or symbol on the current carrier and determined to be reserved (e.g., the GAP).

Assuming that the remaining available resources are N1 reference slots, where N1 is less than or equal to N, the time domain resource that may be used for the sidelink transmission is indicated among the remaining reference slots. For example, a bitmap (b0, b1, ..., bL3−1) with a length of L3 is set. If a reference slot n1 among the remaining resources within the configuration period satisfies that b (n1 mod L3)=1, the reference slot n1 is available for the sidelink transmission, where n1=0, 1, ..., N1−1.

In an example, L3 may be equal to N1.

Example Four

Example four is used for describing a frequency domain configuration of the sidelink resources on a carrier on which multiple different types of traffic can be supported. Therefore, multiple time-frequency parameters (numerologies) need to be supported on the carrier. A frequency domain range on the carrier may be referred to as a bandwidth part (BWP), one BWP corresponds to one fourth time-frequency parameter (numerology) used by the BWP, and one or more BWPs available for the sidelink may be defined on the carrier. The BWP includes several subcarriers or several resource blocks (RBs) (which are typically several subcarriers) or several subchannels (which are typically several RBs), where the subcarriers are defined by the fourth time-frequency parameter corresponding to the BWP.

Embodiment Three

This embodiment is described by using an example in which a sidelink resource pool is configured based on the configured set of alternative resources. In this example, the sidelink resource pool is (pre-)configured/determined and it is indicated that a resource belonging to the sidelink resource pool is mapped from the set of alternative resources. The resource in the sidelink resource pool is defined by the resource granularity determined by a second time-frequency parameter. Two configuration examples of the sidelink resource pool are described below.

Example Five

Alternative resources that may be used for a sidelink transmission are determined in examples one to four described above. Resources that can be specifically used by a sidelink are defined by one or more sidelink resource pools. For example, the sidelink resource pool is (pre-)configured/determined and it is indicated that the resource belonging to the sidelink resource pool is mapped from the set of alternative resources. The sidelink resource pool includes several resources using a second time slot as the resource granularity, where the second time slot is determined by the second time-frequency parameter. In this example, it is assumed that the second time-frequency parameter is the same as the first time-frequency parameter (a reference numerology). In this case, the second time slot in the sidelink resource pool is equal to one first time slot (that is, reference slot) in time domain. In this example, a method for (pre)-configuring/determining the resource in the resource pool may include a method described below.

It is assumed that the number of alternative sidelink resources (that is, first time slots) included in a configuration period is N and a bitmap (b0, b1, . . . , bL2−1) with a length of L2 is set. If an alternative resource m satisfies that b (m mod L2)=1, the resource belongs to the current sidelink resource pool, where n=0, 1, . . . , N−1. Optionally, in a special case where all bits in the bitmap are 1, all the alternative sidelink resources may be used for the resource pool by default and an indication of the bitmap may not be required.

A configuration of the sidelink resource pool may further include configuring a third time-frequency parameter used by the current resource pool. In this example, one of the following manners may be used: the third time-frequency parameter is a time-frequency parameter used by the current resource pool and indicated in configuration or pre-configuration signaling; or the third time-frequency parameter is a fourth time-frequency parameter corresponding to a BWP to which the current resource pool belongs, which is indicated in the configuration or pre-configuration signaling.

The configuration of the sidelink resource pool may further include configuring a frequency domain range of the current sidelink resource pool, which may be configured in one of manners described below in this example.

The frequency domain range of the sidelink resource pool is indicated based on a subcarrier spacing in the second time-frequency parameter for defining the sidelink resource pool, for example, a starting frequency domain subcarrier/RB/subchannel and the number of subcarriers/RBs/subchannels included in the sidelink resource pool on a carrier.

The frequency domain range of the resource pool is indicated based on a subcarrier spacing in the third time-frequency parameter used by the sidelink resource pool, for example, a starting frequency domain subcarrier/RB/subchannel and the number of included subcarriers/RBs/subchannels.

A frequency domain range of the BWP to which the current sidelink resource pool belongs is indicated and the frequency domain range is indicated based on a subcarrier spacing in the fourth time-frequency parameter corresponding to the BWP, for example, a starting frequency domain subcarrier/RB/subchannel and the number of included subcarriers/RBs/subchannels in the BWP.

In a special case where the frequency domain range of the current resource pool is the same as the frequency domain range of the BWP, the frequency domain range may not need to be additionally indicated in this example.

Example Six

The sidelink resource pool is (pre-)configured/determined and it is indicated that the resource belonging to the sidelink resource pool is mapped from the set of alternative resources. The sidelink resource pool includes several resources using the second time slot as the resource granularity, where the second time slot is determined by the second time-frequency parameter. In this example, it is assumed that the second time-frequency parameter is the same as the third time-frequency parameter. In this example, the third time-frequency parameter used by the current sidelink resource pool is indicated in the following manner: the third time-frequency parameter is the time-frequency parameter used by the current resource pool and indicated in the configuration or pre-configuration signaling; or the third time-frequency parameter is the fourth time-frequency parameter corresponding to the BWP to which the current resource pool belongs, which is indicated in the configuration or pre-configuration signaling.

A method for (pre-)configuring/determining the second time slot in the sidelink resource pool is described below. Assuming that the number of first time slots (defined by the reference time-frequency parameter) included within the configuration period is N, the corresponding number of alternative second time slots defined by the second time-frequency parameter is N multiplied by $2^\mu$, where $2^\mu$ is a ratio of the subcarrier spacing (SCS) in the second time-frequency parameter to a subcarrier spacing (SCS) corresponding to the first time-frequency parameter. For example, when the ratio is 2 (the case is the same as that in example five when the ratio is 1), the reference slot is twice time slots corresponding to the third time-frequency parameter. The bitmap (b0, b1, . . . , bL2−1) with a length of L2 is set. If a second time slot m defined by the third time-frequency parameter for the sidelink resource pool satisfies that b (m mod L2)=1, the resource belongs to the current sidelink resource pool, where m=0, 1, . . . , N*2−1. Optionally, in the special case where all the bits in the bitmap are 1, all the alternative sidelink resources may be used for the resource pool by default and the indication of the bitmap may not be required.

The configuration of the sidelink resource pool may further include configuring the frequency domain range of the current sidelink resource pool, which may be configured in one of manners described below in this example.

The frequency domain range of the sidelink resource pool is indicated based on the subcarrier spacing in the second time-frequency parameter for defining the sidelink resource pool, for example, the starting frequency domain subcarrier/RB/subchannel and the number of subcarriers/RBs/subchannels included in the sidelink resource pool on the carrier.

The frequency domain range of the resource pool is indicated based on the subcarrier spacing in the third time-frequency parameter used by the sidelink resource pool, for example, the starting frequency domain subcarrier/RB/subchannel and the number of included subcarriers/RBs/subchannels.

The frequency domain range of the BWP to which the current sidelink resource pool belongs is indicated and the frequency domain range is indicated based on the subcarrier spacing in the fourth time-frequency parameter corresponding to the BWP, for example, the starting frequency domain subcarrier/RB/subchannel and the number of included subcarriers/RBs/subchannels in the BWP. In the special case where the frequency domain range of the current resource pool is the same as the frequency domain range of the BWP, the frequency domain range may not need to be additionally indicated in this example.

Embodiment Four

A sidelink resource pool is described in this embodiment by way of example. In this embodiment, a TTI refers to a resource block in the resource block and is a resource length occupied by one sidelink transmission. The resource block may include one or more second time slots determined by a second time-frequency parameter and the sidelink resource pool may include multiple kinds of resource blocks. For example, some resource blocks may each include one second time slot, some resource blocks may each include multiple second time slots, or some resource blocks may each include half the second time slot. For example, example seven is provided below.

Example Seven

One or more sidelink resource pools are configured or pre-configured, where each sidelink resource pool includes several second time slots and the second time slot is determined by the second time-frequency parameter. The second time slot is used as an example in this example to describe that a UE uses the resource block in the sidelink resource pool.

When the UE uses the sidelink resource pool, a time domain resource length occupied by one transmission may be referred to as the resource block within which a transmission block (TB) or multiple repeated or non-repeated TBs may be transmitted.

(1) The resource block may be one or more second time slots in time domain. The advantage of bundling second time slots for usage is that GAP time for transmit/receive transition and AGC time do not need to be considered between two time slots so that the overheads of AGC and a GAP can be reduced, larger data packets can be transmitted, and repeated sending can be performed multiple times.

(2) The resource block may be less than one second time slot, for example, 1/h time slots, where h is a positive integer. The advantage of the use of the time slot divided into multiple parts is that a scheduling delay can be reduced.

Moreover, it is to be understood that a length of the resource block in the sidelink resource pool is not necessarily unique, For example, the following cases may exist.

(1) The resource blocks in the sidelink resource pool have the same length. For example, all the resource blocks have a length equal to two second time slots.

(2) The resource blocks in the sidelink resource pool may have multiple lengths. For example, an nth resource block in the sidelink resource pool may be one second time slot, an (n+1)th resource block may be two second time slots, and an (n+3)th resource block may be half the second time slot. The advantage of such a setting is that multiple kinds of traffic with different characteristics can be supported by the sidelink resource pool.

In this embodiment, a manner for (pre-)configuring/determining a structure of each resource block in the sidelink resource pool may include, but is not limited to, manners described below.

(a) The structure of the resource block is determined according to a default configuration or a predefined manner. That is, the structure of the resource block is determined according to default symbol configuration information. For example, the sidelink resource pool is configured with a default resource block configuration (that is, the default symbol configuration information), where the default configuration determines that a sidelink(i) signal cannot be sent on resources at fixed positions of the resource block. For example, last X symbols in each resource block are reserved symbols and cannot be sent, where X may be a rational number (less than 1 or greater than or equal to 1). The symbols here may be symbols defined by a first time-frequency parameter or the second time-frequency parameter.

(b) A reserved symbol in a certain resource block is explicitly indicated. That is, the structure of the resource block is determined according to explicit symbol configuration information. For example, a time domain position of the resource block in the sidelink resource pool is indicated and which symbols in the resource block are reserved (or available) is indicated. If the default resource block configuration exists, the default resource block configuration is overwritten with an explicit indication.

For ease of understanding, the description is provided below in conjunction with examples eight to ten.

Example Eight

In this example, the sidelink resource pool is (pre-)configured/determined and includes several resource blocks (TTIs). In this example, it is assumed that all the resource blocks have the same length, for example, are one second time slot determined by the second time-frequency parameter for defining the sidelink resource pool. When the second time slot is determined to belong to the resource block in the sidelink resource pool, all second symbols in the resource block may not necessarily be used for sending sidelink data. Special symbols in these resource blocks may include at least one of symbols described below.

(1) Some second symbols are used as the GAP time for the transmit/receive transition or the like and signals cannot be sent on these symbols. The symbols used as the GAP may be one or more second symbols or 1/h second symbols, where h is a positive integer. The second symbol in this example refers to a symbol determined by the second time-frequency parameter, or may of course be a symbol determined by the first time-frequency parameter or a symbol determined by a third time-frequency parameter used by the sidelink resource pool.

(2) Some second symbols are used as the AGC and signals may be sent on these second symbols. However, the effect of the AGC needs to be considered for the reception of the signals sent on these second symbols. The second symbols used as the AGC may be one or more second symbols or 1/h second symbols, where h is a positive integer. The second symbol in this example refers to the symbol determined by the second time-frequency parameter, or may of course be the symbol determined by the first time-frequency parameter or the symbol determined by the third time-frequency parameter used by the sidelink resource pool.

(3) Some second symbols are reserved or used by a network and cannot be used for a sidelink transmission.

Therefore, when the sidelink transmission is performed, available or unavailable symbols in the resource block may be determined. Specifically, in this example, assuming that all the resource blocks have the same resource format, a method for (pre-)configuring/determining the format of the resource blocks is described by using how to solve a configuration of the GAP as an example.

(a) The structure of the resource block is implicitly determined according to the default configuration or the predefined manner. For example, when the sidelink resource pool is configured, the sidelink signal cannot be sent on symbols at fixed symbol positions of each resource block in the sidelink resource pool by default according to a protocol (that is, as indicated in the default symbol configuration information). For example, X symbols in each resource block are reserved symbols. For different time-frequency parameters, X may have different values by default and the number X of the symbols which cannot be used for sending the sidelink signal may be a rational number (less than 1 or greater than or equal to 1). This can be used for setting a duration of the GAP. For example, a last or first half symbol in a time slot of 15 kHz serves as the GAP by default. Assuming that the duration of the GAP is unchanged, two symbols of 60 kHz are needed to serve as the GAP for the numerology corresponding to 60 kHz.

(b) One resource block structure is configured for the sidelink resource pool, where all the resource blocks in the sidelink resource pool have the same format, that is, resources on the same configured symbol position of each resource block cannot be used to send the sidelink signal. For example, X symbols in each resource block are configured to be reserved symbols, where X may be a rational number (less than 1 or greater than or equal to 1). The X symbols may be consecutive or non-consecutive, which depends on the configuration of the format/structure of the resource block in the sidelink resource pool. In this manner, the duration of the GAP can be set using the sidelink resource pool as the granularity.

Example Nine

In this example, the sidelink resource pool is (pre-)configured/determined and includes several resource blocks. In this example, it is assumed that all the resource blocks may have the same length or different lengths. For example, in example eight, all the second symbols in the resource block may not necessarily be used for sending the sidelink data. These second symbols include GAP symbols for transmit/receive transition. Therefore, when the sidelink transmission is performed, available or unavailable second symbols in the resource block need to be determined. Specifically, in this example, it is assumed that an example for (pre-)configuring/determining the format of the resource block in the sidelink resource pool is described by using how to solve the configuration of the GAP as an example. The format or structure of each resource block is explicitly indicated, that is, indicated in the explicit symbol configuration information. For example, the time domain position or number of the resource block in the sidelink resource pool is specifically indicated and which second symbols in the resource block are reserved (or available) is indicated. In this example, the explicit symbol configuration information does not limit that one resource block must correspond to one piece of explicit symbol configuration information which may be described below.

(a) One resource block corresponds to one resource block structure indication, that is, one piece of explicit symbol configuration information.

(b) The resource blocks are grouped and each group has the same resource block structure and is indicated using one resource block structure indication (that is, the explicit symbol configuration information). Different groups may correspond to different resource block structure indications.

(c) One resource block structure indication (that is, the explicit symbol configuration information) indicates the structures of multiple resource blocks which may be the same or different.

Example Ten

This example may be understood as a combination of examples eight and nine. For example, the method for (pre-)configuring/determining the format of the resource block in the sidelink resource pool is described below.

(1) One sidelink resource pool is predefined or configured/pre-configured with a default resource block structure/format (that is, the default symbol configuration information). Without a specific indication, the resource block will determine reserved symbols by using the default resource block structure/format (the default symbol configuration information).

(2) The format or structure of a certain resource block is explicitly indicated (that is, the explicit symbol configuration information). For example, the time domain position or number of the resource block in the sidelink(i) resource pool is specifically indicated and which symbols in the resource block are reserved (or available) is indicated. The default format (that is, the default symbol configuration information) is no longer used for these particularly indicated resource blocks, but the explicit indication for the resource block is used, that is, a default resource block structure configuration is overwritten with the explicit indication. Likewise, the format of specific configuration signaling is not limited here.

Example Eleven

It is to be understood that the configuration methods in examples eight to ten in this embodiment are also applicable to the configuration of AGC symbols in the resource block except that the AGC symbols may send signals. In this example, in order to uniformly consider the AGC symbols and the GAP symbols, the AGC symbols and the GAP symbols may collectively occupy Xa+Xb symbols, for example, one symbol in one time slot of 15 kHz. In this example, in order to achieve this object and avoid interference with a cellular network, the UE may advance its sidelink timing with respect to its synchronization reference, and a sidelink timing advance may be different when a different carrier is used. For example, the example includes cases described below.

(1) When a dedicated carrier is used, the timing advance may be 0.

(2) When an FDD carrier is used, the advance may be greater than or equal to a configured or predefined maximum time advance (TA) which is generally twice a maximum propagation delay under a maximum coverage radius.

(3) When a TDD carrier is used, the advance may be greater than or equal to a sum of the maximum TA and receive/transmit transition time, a sum of twice the maximum TA and the receive/transmit transition time, a sum of twice the maximum TA and twice the receive/transmit transition time. The receive/transmit transition time may also be understood as transmit/receive transition time or an offset of TA adjustment or a minimum value of TA adjustment.

Embodiment Five

The present application further provides a sidelink signal sending method on a terminal side. The method includes that a UE performs a signal transmission on a resource block acquired from a configured or pre-configured sidelink resource pool. The acquired resource block may be scheduled by a scheduler (for example, a base station or a specific UE (a road side unit (RSU), a captain of a vehicle team) or acquired in an autonomous acquisition manner. A signal is sent on the acquired resource block, where a structure/format of the resource block is sent according to a resource block format configured/pre-configured/determined by a network side. The sending of the UE may further include a step described below.

A time-frequency parameter used for sending the signal is a third time-frequency parameter used by the sidelink resource pool. A resource block format indicating the symbols occupied for sending the signal in the resource block is configured/pre-configured/determined by the network side, and no signal is sent on reserved symbols (a GAP).

Optionally, symbols for sending include Xa special symbols (AGC symbols). The method for configuring, pre-configuring, or determining the Xa symbols may be as illustrated in examples eight to eleven, where Xa is a rational number. A format of an AGC symbol sent by the UE may be described below.

(1) Data channel symbols are sent and may be sent using a frequency domain comb.

(2) DMRS symbols for data demodulation, which may also be sent using the frequency domain comb.

(3) A preamble (a sequence signal) whose main function is AGC adjustment.

(4) A symbol for sending a sidelink control channel, where the sidelink control channel may also be sent using the frequency domain comb or repeatedly sent in time/frequency domain.

In this example, when the UE calculates an amount of data to be sent in one resource block, at least one of the following time-frequency domain resources in the resource block may be excluded: (1) an unavailable resource in the resource block, such as a resource serving as the GAP or a resource corresponding to the reserved symbols; (2) a resource serving as the AGC or a resource corresponding to the AGC symbols; (3) a resource for assisting in demodulation, such as various reference signal resources such as a DMRS resource and a phase tracking reference signal (PTRS) resource; or (4) a resource occupied by the sidelink control channel.

Corresponding operations such as modulation and coding are performed according to the calculated amount of data, and the data is mapped to resources in the resource block to be sent.

Embodiment Six

Figure 4:
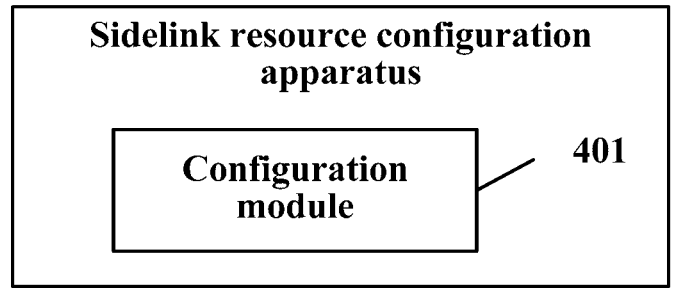
FIG. 4 is a structural diagram of a sidelink resource configuration apparatus according to embodiment six of the present application.

This embodiment provides a sidelink resource configuration apparatus which may be disposed in a base station or in a terminal. As shown in FIG. 4, the apparatus includes a configuration module 401.

The configuration module 401 is configured to configure or pre-configure a sidelink resource pool for a UE to perform sidelink communications using a resource in the sidelink resource pool. A function of the configuration module 401 in this embodiment may be implemented by a processor or a controller in the base station or the terminal.

In this embodiment, the sidelink resource pool uses a second time slot as granularity and includes resource blocks (also referred to as TTIs). In this embodiment, one resource block is a resource length required to be occupied by one sidelink transmission, and an ith resource block in the sidelink resource pool is $k(i)$ times the second time slot, where $k(i)$ is greater than 0. In some application examples of this embodiment, the value of $k(i)$ may be an integer value or a non-integer value greater than or equal to 1, such as 1 or 2. That is, in some application examples, the resource block includes at least one complete second time slot. In other application examples, the value of the resource block may also be a decimal value greater than 0 and less than 1, such as 0.5. That is, the resource block is equal to half the second time slot. Moreover, the lengths of resource blocks in the sidelink resource pool may be the same or partially the same or totally different, which may be flexibly set according to specific requirements.

In this embodiment, a length of the second time slot in the sidelink resource pool is determined according to a second time-frequency parameter for defining the sidelink resource pool, the second time slot is determined by mapping from a first time slot included in a set of alternative resources according to a conversion relationship between the second time-frequency parameter and a first time-frequency parameter used by the set of alternative resources, and a length of the first time slot is determined according to the first time-frequency parameter.

The time-frequency parameter in this embodiment may be a parameter for determining at least one of a subcarrier spacing, a symbol time length, or a CP length. For example, the time-frequency parameter may include a subcarrier spacing parameter and may also include a CP length parameter or the like.

In this embodiment, when a certain communication system or technology (such as a 5G technology) includes multiple time-frequency parameters, different time-frequency parameters may include different subcarrier spacings. The 5G technology is used as an example below. However, it is to be understood that the communication system or technology is not limited to the 5G technology.

In this embodiment, the configuration module 401 may be further configured to configure bandwidth parts (BWPs) on a carrier, where each of the BWPs corresponds to one fourth time-frequency parameter. Moreover, in some application examples, different fourth time-frequency parameters may include different subcarrier spacings. It is to be understood that the carrier in this embodiment may include one or more BWPs. When the carrier includes multiple BWPs, the BWPs may correspond to the same fourth time-frequency parameter or different fourth time-frequency parameters, that is, different BWPs may correspond to the same subcarrier spacing or different subcarrier spacings, which may be flexibly set according to communication requirements.

In this embodiment, the sidelink resource pool further includes a currently used third time-frequency parameter. The third time-frequency parameter is a pre-configured time-frequency parameter and may be the same as or different from one of the first time-frequency parameter, the second time-frequency parameter, or the fourth time-frequency parameter. For example, in an example, a manner for setting the third time-frequency parameter includes, but is not limited to, any one of the following two manners: the third time-frequency parameter is the pre-configured time-frequency parameter, that is, may be a time-frequency parameter used currently indicated in configuration or pre-configuration signaling; or the third time-frequency parameter is a fourth time-frequency parameter for one of the BWPs to which the sidelink resource pool belongs, which is indicated through configuring or pre-configuring.

Correspondingly, the sidelink resource pool in this embodiment further includes a frequency domain range which may, but may not necessarily, be indicated in at least one of the following manners: indicating a frequency domain range of a sidelink resource based on a subcarrier spacing included in the second time-frequency parameter; indicating a frequency domain range of a sidelink resource based on a subcarrier spacing included in the third time-frequency parameter; or indicating a frequency domain range of a sidelink resource based on a subcarrier spacing in the fourth time-frequency parameter of the BWP to which the sidelink resource pool belongs.

In this embodiment, the set of alternative resources further includes first resource transmission indication information for indicating whether a first symbol included in a first time slot or a first time slot in the set of alternative resources within a configuration period is available for the sidelink transmission. In an example, the configuration period is equal to a resource configuration period or a System Frame Number period or a Direct Frame Number period of cellular network data on the carrier.

The sidelink resource pool further includes default symbol configuration information for indicating whether a second symbol included in a resource block is available for the sidelink transmission. The default symbol configuration information is obtained according to the first resource transmission indication information. In this embodiment, the default symbol configuration information may also be referred to as a default configuration or predefined indication information.

In an example of this embodiment, the first resource transmission indication information may include, but is not limited to, at least one of indication information described below.

Indication information one is information indicating that a first time slot or a first symbol on a current carrier and configured to be a downlink resource is unavailable for the sidelink transmission.

Indication information two is information indicating that a first time slot or a first symbol on a current carrier and configured to be flexible (a flexible resource) is unavailable for the sidelink transmission.

Indication information three is information indicating that a first time slot or a first symbol on a current carrier and configured to send a sidelink synchronization signal is unavailable for the sidelink transmission.

Indication information four is information indicating that a first time slot or a first symbol on a current carrier and configured to be reserved is unavailable for the sidelink transmission.

Indication information five is information indicating that within the configuration period a first time slot n which satisfies that b (n mod L1)=1 is available for the sidelink transmission, where mod denotes a modulo calculation, n=0, 1, . . . , N−1, N is the number of first time slots within the configuration period, and L1 is a length of a first bitmap (b0, b1, . . . , bL1−1).

In an example, the first resource transmission indication information about which first time slot or first symbol included in the first time slot is unavailable (or available) for the sidelink transmission may be determined by at least one of indication information one to four in conjunction with indication information five. A specific indication manner may be flexibly set according to specific application scenarios.

In another application scenario of this embodiment, the first resource transmission indication information may include at least one of indication information described below. In a case where a certain first time slot is configured or pre-configured to be available for the sidelink transmission and the first time slot is configured or pre-configured to be a downlink time slot or includes a downlink symbol, the first time slot or the corresponding downlink symbol in the first time slot is unavailable for the sidelink transmission. In a case where a certain first time slot is configured or pre-configured to be available for the sidelink transmission and the first time slot is configured or pre-configured to send the sidelink synchronization signal, the first time slot is unavailable for the sidelink transmission. In a case where a certain first time slot is configured or pre-configured to be available for the sidelink transmission and the first time slot is configured or pre-configured to be a reserved time slot or includes a reserved symbol, the first time slot or the reserved symbol included in the first time slot is unavailable for the sidelink transmission. In a case where a certain first time slot is configured or pre-configured to be available for the sidelink transmission and the first time slot is configured or pre-configured to be a flexible time slot or includes a flexible symbol, the first time slot or the flexible symbol in the first time slot is unavailable for the sidelink transmission, or the first time slot or the flexible symbol in the first time slot is available for the sidelink transmission.

In another example of this embodiment, explicit symbol configuration information for indicating whether the second symbol in the resource block is available for the sidelink transmission may also be configured in the sidelink resource pool. Moreover, it is to be understood that one resource block may correspond to one piece of explicit symbol configuration information, one piece of explicit symbol configuration information may also correspond to a group of resource blocks with the same structure, or one piece of explicit symbol configuration information indicates multiple resource blocks which may have different structures. Therefore, the explicit symbol configuration information may be specifically set in a flexible manner. Moreover, which second symbols are unavailable (or available) for the sidelink transmission is specifically indicated by the explicit symbol configuration information, which may also be flexibly determined according to specific application scenarios.

In an example of this embodiment, when a certain resource block in the sidelink resource pool is configured with both the default symbol configuration information and the explicit symbol configuration information, the default symbol configuration information is overwritten with the explicit symbol configuration information. That is, the explicit symbol configuration information is used as reference, that is, a priority of the explicit symbol configuration information is configured to be higher than that of the default symbol configuration information.

In this embodiment, the operation for determining the second time slot by mapping the first time slot included in the set of alternative resources according to the conversion relationship between the second time-frequency parameter and the first time-frequency parameter used by the set of alternative resources includes operations described below. The number of alternative second time slots for the sidelink resource pool is determined to be $N*2^\mu$, where N is the number of first time slots in the set of alternative resources within the configuration period, and $2^\mu$ is a ratio of a subcarrier spacing in the second time-frequency parameter to a subcarrier spacing in the first time-frequency parameter. It is determined that a second time slot m which satisfies that b (m mod L2)=1 among $N*2^\mu$ second time slots belongs to the sidelink resource pool, where m=0, 1, . . . , $N*2^\mu-1$, and L2 is a length of a second bitmap (b0, b1, . . . , bL2−1).

In an example of this embodiment, the sidelink resource pool further includes pre-symbol indication information for indicating Xa second symbols which belong to pre-symbols in the resource block. The Xa second symbols are mainly used for automatic gain control (AGC) adjustment, and Xa is a rational number greater than or equal to 0.

In an example of this embodiment, the default symbol configuration information and/or the explicit symbol configuration information include an indication that Xb second symbols serve as a guard period (GP/GAP).

The Xa second symbols and the Xb second symbols are consecutive second symbols, where Xb is a rational number greater than or equal to 0. In some application examples, Xa+Xb may be greater than or equal to 1. That is, in this embodiment, the pre-symbols and the second symbols serving as the GAP may be combined together to occupy Xa+Xb second symbols for uniform setting and management. For example, first or last second symbols may be uniformly set and used. Correspondingly, in this embodiment, the sidelink resource pool further includes timing advance configuration information of the sidelink communications.

For example, in an example, the timing advance configuration information of the sidelink communications includes at least one of configurations described below.

In a case where a dedicated carrier (which, for example, includes, but is not limited to, an unlicensed carrier, a dedicated carrier of the sidelink communications, or the like) is used, a timing advance of the sidelink communications is 0.

In a case where a frequency-division duplexing (FDD) carrier is used, a timing advance of the sidelink communications is greater than or equal to a preset maximum time advance (TA). The maximum time advance (TA) in this embodiment may be twice a maximum propagation delay of the UE under a maximum coverage radius of the base station.

In a case where a time-division duplexing (TDD) carrier is used, a timing advance of the sidelink communications is greater than or equal to a sum of a preset maximum time advance (TA) and receive/transmit transition time, or greater than or equal to a sum of 2*TA and the receive/transmit transition time, or greater than or equal to a sum of 2*TA and twice the receive/transmit transition time.

This embodiment further provides a sidelink communication method. The method includes: sending a signal on a resource block in a sidelink resource pool acquired by the sidelink resource configuration method described above, where the signal is sent using a third time-frequency parameter for sending signals with the sidelink resource pool.

In an example of this embodiment, at least one of the following is sent on a second symbol which belongs to a pre-symbol in the resource block: a data channel symbol, a demodulation reference signal (DMRS) symbol for data demodulation, a preamble signal symbol, or a sidelink control channel symbol. In an example, data channel symbols may also be sent using a frequency domain comb. In an example, DMRS symbols for data demodulation may also be sent using the frequency domain comb. In an example, control channel symbols may also be sent using the frequency domain comb or repeatedly sent in time/frequency domain.

Figure 5:
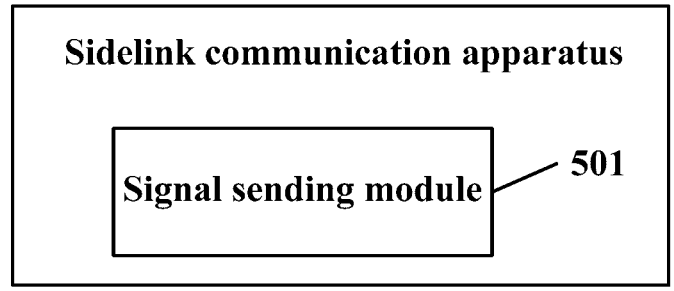
FIG. 5 is a structural diagram of a sidelink communication apparatus according to embodiment six of the present application.

This embodiment provides a sidelink communication apparatus which may be disposed in a terminal. As shown in FIG. 5, the apparatus includes a signal sending module 501. The signal sending module 501 is configured to send a signal on a resource block in the sidelink resource pool acquired by the sidelink resource configuration method described in the above embodiment, where the signal is sent using a third time-frequency parameter for sending a signal with the sidelink resource pool. A function of the signal sending module 501 in this embodiment may be implemented by a processor or a controller in the terminal.

In an example of this embodiment, at least one of the following is sent on a second symbol which belongs to a pre-symbol in the resource block: a data channel symbol, a demodulation reference signal (DMRS) symbol for data demodulation, a preamble signal symbol, or a sidelink control channel symbol. In an example, data channel symbols may also be sent using a frequency domain comb. In an example, DMRS symbols for data demodulation may also be sent using the frequency domain comb. In an example, control channel symbols may also be sent using the frequency domain comb or repeatedly sent in time/frequency domain.

Embodiment Seven

Figure 6:
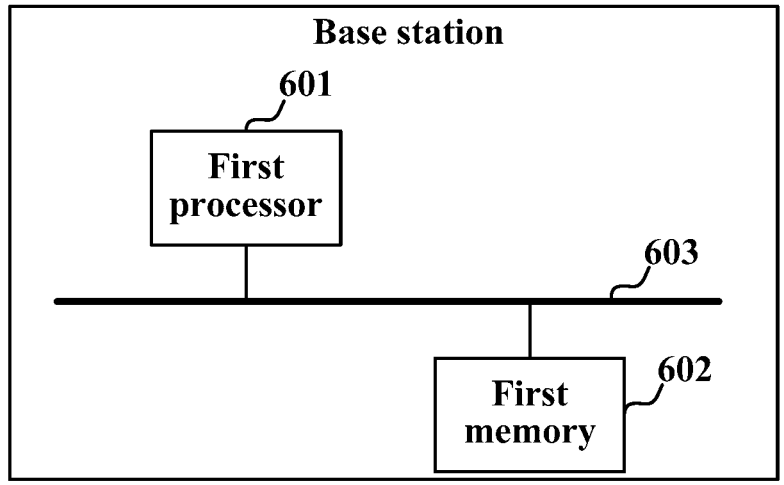
FIG. 6 is a structural diagram of a base station according to embodiment seven of the present application.

This embodiment further provides a base station. As shown in FIG. 6, the base station includes a first processor 601, a first memory 602, and a first communication bus 603. The first communication bus 603 is configured to implement a communication connection between the first processor 601 and the first memory 602. The first processor 601 is configured to execute one or more first computer programs stored in the first memory 602 to implement steps of the sidelink resource configuration method in the embodiments described above.

Figure 7:
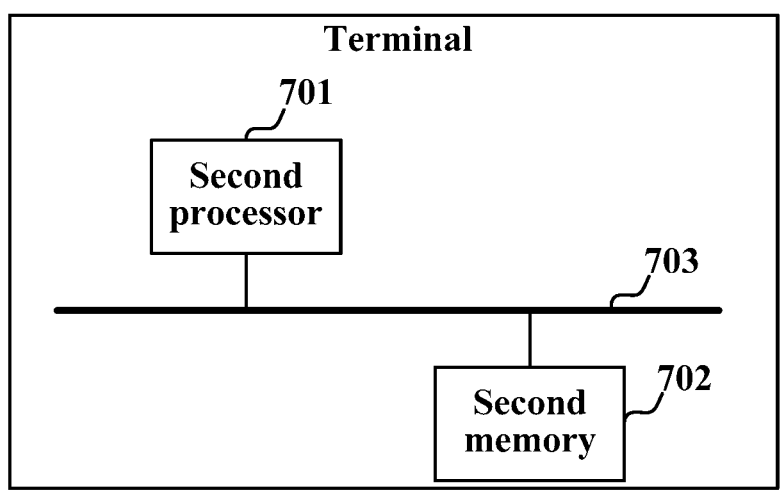
FIG. 7 is a structural diagram of a terminal according to embodiment seven of the present application.

This embodiment further provides a terminal. As shown in FIG. 7, the terminal includes a second processor 701, a second memory 702, and a second communication bus 703. The second communication bus 703 is configured to implement a communication connection between the second processor 701 and the second memory 702. The second processor 701 is configured to execute one or more second computer programs stored in the second memory 702 to implement steps of the sidelink communication method in the embodiments described above.

This embodiment further provides a computer-readable storage medium. The computer-readable storage medium includes volatile or nonvolatile and removable or non-removable media implemented in any method or technology for the storage of information (such as computer-readable instructions, data structures, computer program modules, or other data). The computer-readable storage medium includes, but is not limited to, a random-access memory (RAM), a read-only memory (ROM), an electrically erasable programmable read-only memory (EEPROM), a flash memory, or other memory technologies, a compact disc read-only memory (CD-ROM), a digital versatile disc (DVD) or other optical disc storage, a magnetic cassette, a magnetic tape, magnetic disk storage, or other magnetic storage apparatuses, or any other medium that may be used for storing desired information and accessed by a computer.

In an example, the computer-readable storage medium in this embodiment may be configured to store one or more first computer programs, where the one or more first computer programs are executable by one or more processors to implement steps of the sidelink resource configuration method in the embodiments described above.

In another example, the computer-readable storage medium in this embodiment may be configured to store one or more second computer programs, where the one or more second computer programs are executable by one or more processors to implement steps of the sidelink communication method in the embodiments described above.

This embodiment further provides a first computer program (or first computer software) which may be distributed on a computer-readable medium and executed by a computing apparatus to implement at least one step of the sidelink resource configuration method illustrated in the embodiments described above. In some circumstances, the at least one step illustrated or described may be performed in sequences different from those described in the embodiments described above.

This embodiment further provides a second computer program (or second computer software) which may be distributed on a computer-readable medium and executed by a computing apparatus to implement at least one step of the sidelink communication method illustrated in the embodiments described above. In some circumstances, the at least one step illustrated or described may be performed in sequences different from those described in the embodiments described above.

This embodiment further provides a computer program product. The computer program product includes a computer-readable apparatus on which the first computer program and/or the second computer program illustrated above are stored. The computer-readable apparatus in this embodiment may include the computer-readable storage medium illustrated above.

It can be seen that those skilled in the art should understand that all or part of the steps of the method and functional modules/units in the system and the apparatus disclosed above may be implemented as software (which may be implemented by computer program codes executable by a computing apparatus), firmware, hardware, and appropriate combinations thereof. In the hardware implementation, the division of the functional modules/units mentioned in the above description may not correspond to the division of physical components. For example, one physical component may have multiple functions, or one function or step may be performed jointly by several physical components. Some or all physical components may be implemented as software executed by a processor such as a central processing unit, a digital signal processor, or a microcontroller, may be implemented as hardware, or may be implemented as integrated circuits such as application-specific integrated circuits.

Additionally, as is known to those of ordinary skill in the art, a communication medium generally includes computer-readable instructions, data structures, computer program modules, or other data in modulated data signals such as carriers or other transmission mechanisms and may include any information delivery medium. Therefore, the present application is not limited to any particular combination of hardware and software.

The above is a more detailed description of the embodiments of the present disclosure in conjunction with specific implementations, and the specific implementations of the present application cannot be construed as being limited to the description. For those of ordinary skill in the art to which the present application pertains, several simple deductions or substitutions may also be made without departing from the concept of the present application and should fall within the scope of the present application.

What is claimed is:

1. A sidelink resource configuration method, comprising:
configuring or pre-configuring a sidelink resource pool for a user equipment (UE) to perform sidelink communications using a resource in the sidelink resource pool;
wherein the sidelink resource pool uses a second time slot as granularity and comprises resource blocks, wherein an ith resource block is k(i) times the second time slot, k(i) is a rational number greater than 0, and i is greater than or equal to 1; and
wherein the second time slot is determined by mapping from a first time slot comprised in a set of alternative resources according to a conversion relationship between a second time-frequency parameter for defining the sidelink resource pool and a first time-frequency parameter used by the set of alternative resources, a length of the first time slot is determined according to the first time-frequency parameter, and a length of the second time slot is determined according to the second time-frequency parameter; and
wherein determining the second time slot by mapping from the first time slot comprised in the set of alternative resources according to the conversion relationship between the second time-frequency parameter and the first time-frequency parameter used by the set of alternative resources comprises:
determining a number of alternative second time slots of the sidelink resource pool to be $N*2^\mu$, where N is the number of first time slots comprised in the set of alternative resources within the configuration period, and $2^\mu$ is a ratio of a subcarrier spacing in the second time-frequency parameter to a subcarrier spacing in the first time-frequency parameter; and
determining an alternative second time slot m which satisfies that b (m mod L2)=1 among $N*2^\mu$ alternative second time slots as the second time slot, where m=0, 1, . . . , $N*2^\mu-1$, and L2 is a length of a second bitmap (b0, b1, . . . , bL2−1).

2. The method of claim 1, wherein the set of alternative resources further comprises first resource transmission indication information for indicating whether a first symbol comprised in a first time slot or a first time slot in the set of alternative resources within a configuration period is available for a sidelink transmission.

3. The method of claim 2, wherein the first resource transmission indication information comprises at least one of following indication information:
information indicating that a first time slot or a first symbol on a current carrier and configured to be a downlink resource is unavailable for the sidelink transmission;
information indicating that a first time slot or a first symbol on a current carrier and configured to be flexible is unavailable for the sidelink transmission;
information indicating that a first time slot or a first symbol on a current carrier and configured to send a sidelink synchronization signal is unavailable for the sidelink transmission;
information indicating that a first time slot or a first symbol on a current carrier and configured to be reserved is unavailable for the sidelink transmission; or
information indicating that within the configuration period a first time slot n which satisfies that b (n mod L1)=1 is available for the sidelink transmission, wherein n=0, 1, . . . , N−1, N is a number of first time slots within the configuration period, and L1 is a length of a first bitmap (b0, b1, . . . , bL1−1).

4. The method of claim 2, wherein the first resource transmission indication information comprises at least one of following indication information:
in a case where the first time slot is configured or pre-configured to be available for the sidelink transmission and the first time slot is configured or pre-configured to be a downlink time slot or comprises a downlink symbol, the first time slot or the corresponding downlink symbol in the first time slot is unavailable for the sidelink transmission;
in a case where the first time slot is configured or pre-configured to be available for the sidelink transmission and the first time slot is configured or pre-configured to send a sidelink synchronization signal, the first time slot is unavailable for the sidelink transmission;
in a case where the first time slot is configured or pre-configured to be available for the sidelink transmission and the first time slot is configured or pre-configured to be a reserved time slot or comprises a reserved symbol, the first time slot or the reserved symbol comprised in the first time slot is unavailable for the sidelink transmission; or
in a case where the first time slot is configured or pre-configured to be available for the sidelink transmission and the first time slot is configured or pre-configured to be a flexible time slot or comprises a flexible symbol, the first time slot or the flexible symbol in the first time slot is unavailable for the sidelink transmission, or the first time slot or the flexible symbol in the first time slot is available for the sidelink transmission.

5. The method of claim 1, wherein the first time-frequency parameter is a time-frequency parameter with a minimum subcarrier spacing among a plurality of time-frequency parameters comprised in a current communication system.

6. The method of claim 1, wherein the sidelink resource pool further comprises default symbol configuration information for indicating whether a second symbol comprised in a resource block comprised in the sidelink resource pool is available for the sidelink transmission.

7. The method of claim 6, wherein the sidelink resource pool further comprises explicit symbol configuration information for indicating whether the second symbol in the resource block is available for the sidelink transmission.

8. The method of claim 7, wherein in a case where the resource block in the sidelink resource pool is configured with the default symbol configuration information and the explicit symbol configuration information, the default symbol configuration information is overwritten with the explicit symbol configuration information.

9. The method of claim 7, wherein the resource block in the sidelink resource pool further comprises pre-symbol indication information for indicating Xa second symbols which belong to pre-symbols and are in the resource block, wherein Xa is a rational number greater than or equal to 0.

10. The method of claim 9, wherein at least one of the default symbol configuration information or the explicit symbol configuration information comprises an indication that Xb second symbols serve as a guard period (GAP);
wherein the Xa second symbols and the Xb second symbols are consecutive second symbols, wherein Xb is a rational number greater than or equal to 0.

11. The method of claim 10, wherein the sidelink resource pool further comprises timing advance configuration information of the sidelink communications;
wherein the timing advance configuration information of the sidelink communications comprises at least one of following configurations:
in a case where a dedicated carrier is used, a timing advance of the sidelink communications is 0;
in a case where a frequency-division duplexing (FDD) carrier is used, a timing advance of the sidelink communications is greater than or equal to a preset maximum time advance (TA); or
in a case where a time-division duplexing (TDD) carrier is used, a timing advance of the sidelink communications is greater than or equal to a sum of a preset maximum TA and receive/transmit transition time, or a timing advance of the sidelink communications is greater than or equal to a sum of 2*TA and receive/transmit transition time, or a timing advance of the sidelink communications is greater than or equal to a sum of 2*TA and twice receive/transmit transition time.

12. The method of claim 1, further comprising: configuring or pre-configuring a third time-frequency parameter used currently for the sidelink resource pool.

13. The method of claim 12, further comprising: configuring or pre-configuring a plurality of bandwidth parts (BWPs) on a carrier for the UE to perform the sidelink communications using a resource in the plurality of BWPs, wherein each of the plurality of BWPs corresponds to one fourth time-frequency parameter; and
the third time-frequency parameter is the fourth time-frequency parameter which is configured or pre-configured to indicate one of the plurality of BWPs to which the sidelink resource pool belongs.

14. The method of claim 13, wherein the sidelink resource pool further comprises a frequency domain range which is indicated in at least one of following manners:
indicating the frequency domain range of the sidelink resource pool based on a subcarrier spacing comprised in the second time-frequency parameter;
indicating the frequency domain range of the sidelink resource pool based on a subcarrier spacing comprised in the third time-frequency parameter; or
indicating the frequency domain range of the sidelink resource pool based on a subcarrier spacing in the fourth time-frequency parameter of the one of the plurality of BWPs to which the sidelink resource pool belongs.

15. A computer-readable storage medium storing at least one first computer program, wherein the at least one first computer program is executable by at least one processor to implement the sidelink resource configuration method of claim 1.

16. A sidelink communication method, comprising:
sending a signal on a resource block in a sidelink resource pool acquired by a sidelink resource configuration method, wherein the signal is sent using a third time-frequency parameter for sending signals with the sidelink resource pool;
wherein the sidelink resource configuration method comprises:
configuring or pre-configuring the sidelink resource pool for a user equipment (UE) to perform sidelink communications using a resource in the sidelink resource pool;
wherein the sidelink resource pool uses a second time slot as granularity and comprises resource blocks, wherein an ith resource block is k(i) times the second time slot, k(i) is a rational number greater than 0, and i is greater than or equal to 1; and wherein the second time slot is determined by mapping from a first time slot comprised in a set of alternative resources according to a conversion relationship between a second time-frequency parameter for defining the sidelink resource pool the second time frequency parameter and a first time-frequency parameter used by the set of alternative resources, and a length of the first time slot is determined according to the first time-frequency parameter, and a length of the second time slot is determined according to the second time-frequency parameter; and wherein determining the second time slot by mapping from the first time slot comprised in the set of alternative resources according to the conversion relationship between the second time-frequency parameter and the first time-frequency parameter used by the set of alternative resources comprises:

determining a number of alternative second time slots of the sidelink resource pool to be $N*2^\mu$, where N is the number of first time slots comprised in the set of alternative resources within the configuration period, and $2^\mu$ is a ratio of a subcarrier spacing in the second time-frequency parameter to a subcarrier spacing in the first time-frequency parameter; and determining an alternative second time slot m which satisfies that b (m mod L2)=1 among $N*2^\mu$ alternative second time slots as the second time slot, where m=0, 1, . . . , $N*2^\mu-1$, and L2 is a length of a second bitmap (b0, b1, . . . , bL2−1).

17. The method of claim 16, wherein at least one of the following is sent on a second symbol which belongs to a pre-symbol and is in the resource block:
a data channel;
a demodulation reference signal (DMRS) for data demodulation;
a preamble signal; or
a sidelink control channel.

18. A sidelink communication apparatus, comprising a processor, a memory, and a communication bus; wherein the communication bus is configured to implement a communication connection between the processor and the memory; and the processor is configured to execute at least one computer program stored in the memory to implement the sidelink communication method of claim 16.

19. A sidelink resource configuration apparatus, comprising a processor, a memory, and a communication bus; wherein the communication bus is configured to implement a communication connection between the processor and the memory; and the processor is configured, when executing at least one computer program stored in the memory, to:

configure or pre-configure a sidelink resource pool for a user equipment (UE) to perform sidelink communications using a resource in the sidelink resource pool;

wherein the sidelink resource pool uses a second time slot as granularity and comprises resource blocks, wherein an ith resource block is k(i) times the second time slot, k(i) is a rational number greater than 0, and i is greater than or equal to 1; and wherein the second time slot is determined by mapping from a first time slot comprised in a set of alternative resources according to a conversion relationship between a second time-frequency parameter for defining the sidelink resource pool and a first time-frequency parameter used by the set of alternative resources, and a length of the first time slot is determined according to the first time-frequency parameter, a length of the second time slot is determined according to the second time-frequency parameter; and wherein determining the second time slot by mapping from the first time slot comprised in the set of alternative resources according to the conversion relationship between the second time-frequency parameter and the first time-frequency parameter used by the set of alternative resources comprises:

determining a number of alternative second time slots of the sidelink resource pool to be $N*2^\mu$, where N is the number of first time slots comprised in the set of alternative resources within the configuration period, and $2^\mu$ is a ratio of a subcarrier spacing in the second time-frequency parameter to a subcarrier spacing in the first time-frequency parameter, and determining an alternative second time slot m which satisfies that b (m mod L2)=1 among $N*2^\mu$ alternative second time slots as the second time slot, where m=0, 1, $N*2^\mu-1$, and L2 is a length of a second bitmap (b0, b1, . . . , bL2−1).

* * * * *

UNITED STATES PATENT AND TRADEMARK OFFICE
CERTIFICATE OF CORRECTION

| | | |
|---|---|---|
| PATENT NO. | : 11,985,634 B2 | Page 1 of 2 |
| APPLICATION NO. | : 17/273701 | |
| DATED | : May 14, 2024 | |
| INVENTOR(S) | : Weimin Xing et al. | |

It is certified that error appears in the above-identified patent and that said Letters Patent is hereby corrected as shown below:

In the Specification

Column 6, Line 17 (approx.), delete "$N_{slot}^{frame,\ \mu}$" and insert -- $N_{slot}^{frame,\mu}$ --.

Column 6, Line 17 (approx.), delete "$N_{slot}^{frame,\ \mu}$" and insert -- $N_{slot}^{frame,\mu}$ --.

Column 11, Line 38, delete "A" and insert -- a --.

Column 13, Line 62-63, delete "sub channels." and insert -- subchannels. --.

Column 14, Line 66-67, delete "sub channels." and insert -- subchannels. --.

In the Claims

Column 28, Line 49, Claim 15, delete "A" and insert -- A non-transitory --.

Column 29, Line 8-9, Claim 16, delete "the second time frequency parameter and" and insert -- and --.

Column 29, Line 10, Claim 16, delete "and a" and insert -- a --.

Column 29, Line 30, Claim 16, delete "$N*2^{\mu}\mu alternative$" and insert -- $N*2^{\mu}$ alternative --.

Column 30, Line 23-24, Claim 19, delete "and a" and insert -- a --.

Column 30, Line 25, Claim 19, delete "a" and insert -- and a --.

Column 30, Line 40, Claim 19, delete "parameter," and insert -- parameter; --.

Signed and Sealed this
Twenty-seventh Day of August, 2024

*Katherine Kelly Vidal*

Katherine Kelly Vidal
*Director of the United States Patent and Trademark Office*

Column 30, Line 42, Claim 19, delete "N* $2^\mu$"" and insert -- $N*2^\mu$ --.

Column 30, Line 43, Claim 19, delete "1, $N*2^\mu$-1," and insert -- 1, . . . , $N*2^\mu$-1, --.